Figure 1:
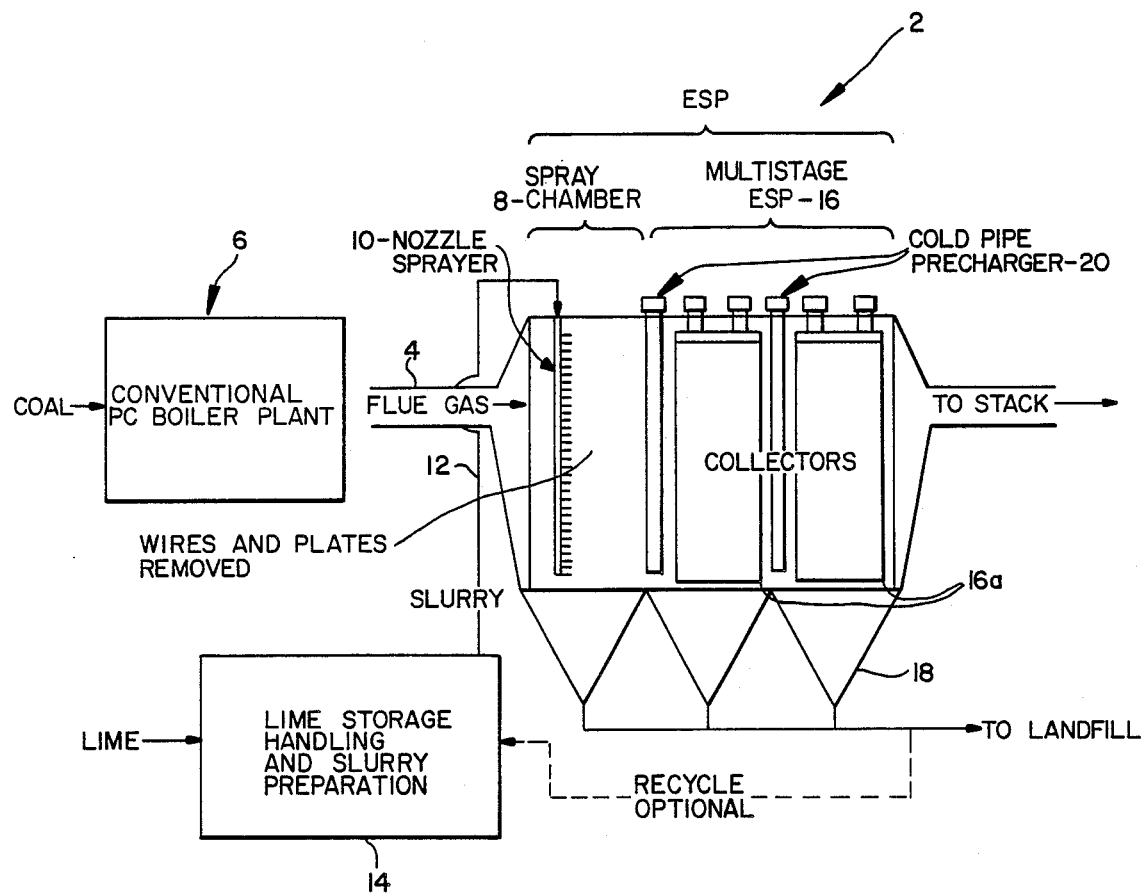
Figure 2:
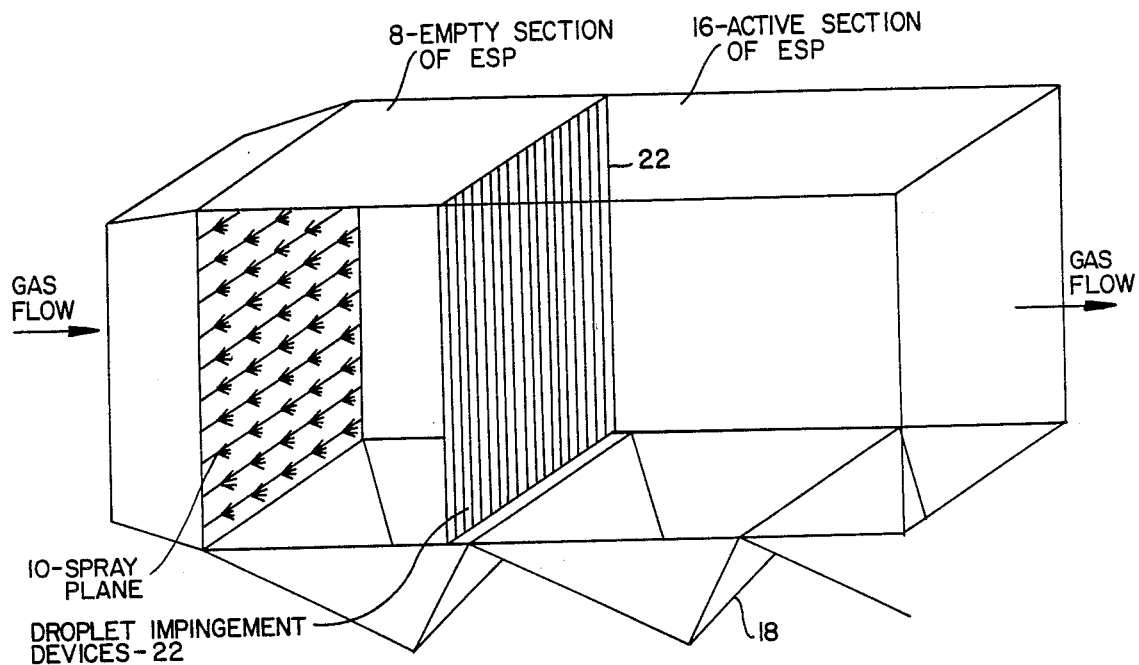
Figure 3:
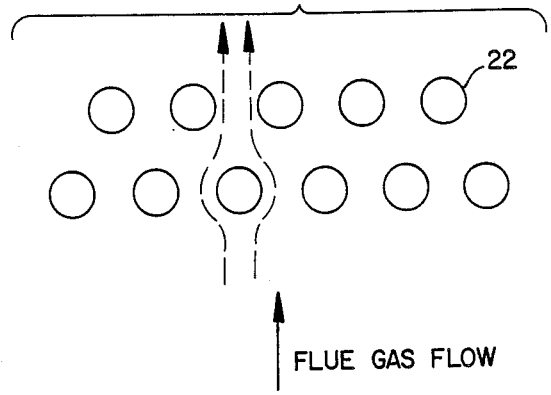
Figure 4:
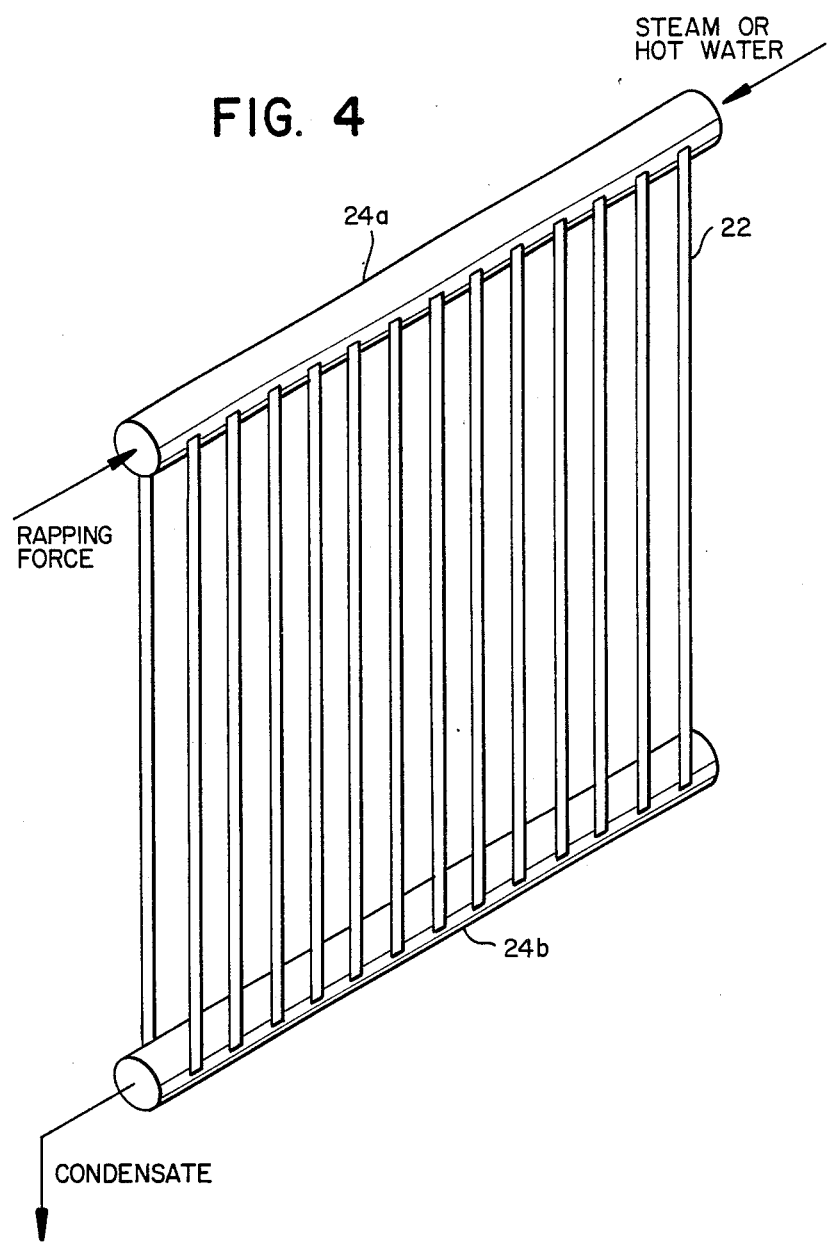
Figure 5:
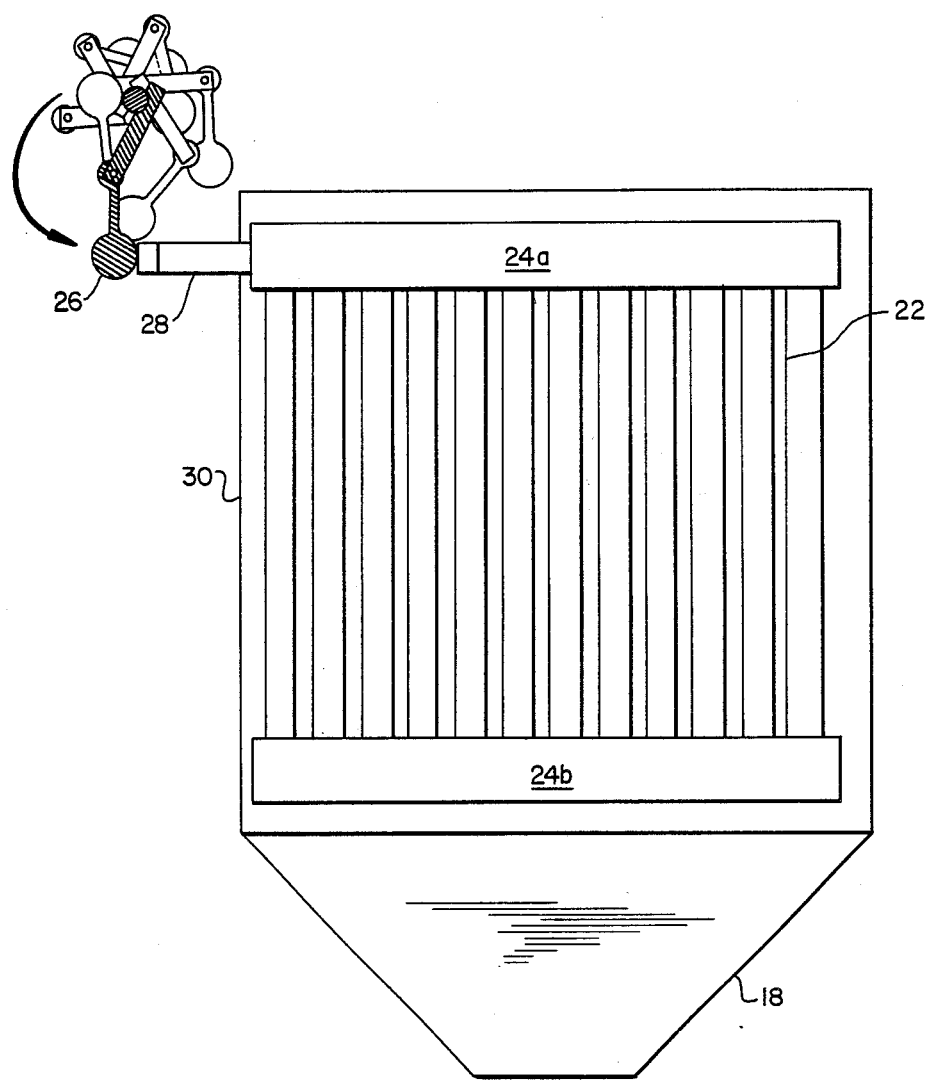

United States Patent [19]

Downs

[11] Patent Number: 4,888,158

[45] Date of Patent: Dec. 19, 1989

[54] DROPLET IMPINGEMENT DEVICE

[75] Inventor: William Downs, Alliance, Ohio

[73] Assignee: The Babcock & Wilcox Company, New Orleans, La.

[21] Appl. No.: 261,456

[22] Filed: Oct. 24, 1988

[51] Int. Cl.$^4$ .............................................. C01B 17/00
[52] U.S. Cl. ........................................ 423/242; 55/10; 55/96; 55/73; 55/122; 55/269; 423/244; 422/169; 422/173
[58] Field of Search .................... 55/73, 9, 10, 96, 300, 55/122, 80, 269, 444, 446, 461–465; 159/4.02, 4.01; 165/175, 84; 422/169, 173; 34/79

[56] References Cited

U.S. PATENT DOCUMENTS

| 2,703,151 | 3/1955 | Glinka | 55/444 |
|---|---|---|---|
| 3,257,777 | 6/1966 | Weisse | 165/84 |
| 4,001,384 | 1/1977 | Iwakura et al. | 423/244 A |
| 4,295,519 | 10/1981 | Bellaff | 55/269 |
| 4,545,792 | 10/1985 | Huttlin | 55/269 |

FOREIGN PATENT DOCUMENTS

| 561844 | 7/1977 | U.S.S.R. | 55/269 |
|---|---|---|---|
| 712639 | 1/1980 | U.S.S.R. | 165/84 |

Primary Examiner—Bernard Nozick
Attorney, Agent, or Firm—Vytas R. Matas; Robert J. Edwards; Daniel S. Kalka

[57] ABSTRACT

An apparatus and method for separating unevaporated droplets from a hot gas stream such as a flue gas. The apparatus referred to as a droplet impingement device is designed to enable a modified electrostatic precipitator to efficiently remove sulfur dioxide and particulates. The droplet impingement device removes the unevaporated alkaline droplets and provides the first stage of flow correction necessary in reducing velocity mal-distribution.

15 Claims, 4 Drawing Sheets

DROPLET IMPINGEMENT DEVICE

FIELD OF THE INVENTION

The present invention relates in general to an apparatus for separating unevaporated droplets from a hot gas stream, and in particular, finds utility in emission control equipment for fossil fuel fired boilers for simultaneous $SO_x$ and particulate removal with a modified electrostatic precipitator (ESP).

DESCRIPTION OF THE RELATED ART

Current energy policy in the United States is based on the expanded use of coal in utility and industrial applications. This use must not compromise environmental requirements, however. Advanced control technologies are needed to control the increase in pollutant emissions in coal combustion. These pollutants include particulates, sulfur oxides ($SO_x$), and oxides of nitrogen ($NO_x$).

Impingement separators are used in numerous industrial applications. In most cases the application is intended to remove all of the particulate in the gas stream. Examples include chevron type separators used in wet scrubbers to remove entrained slurry droplets, chevron separators used in steam drums to aid steam-water separation, and the I-beam separators used in circulating fluidized beds.

Flyash and other particulate material can effectively be controlled using baghouses. U.S. Pat. No. 4,309,386 assigned to the present Assignee discloses a hot catalytic baghouse which simultaneously removes particulate material and reduces $NO_x$ emissions. The use of a hot catalytic baghouse which also simultaneously collects $SO_x$, $NO_x$, and particulates, is disclosed in U.S. patent application entitled "Integrated Injection and Bag Filter House System for $SO_x$, $NO_x$, Particulate Control with Reagent/Catalyst Regeneration", co-invented by the inventor of the present application, filed Nov. 19, 1986 and having Ser. No. 932,754 now U.S. Pat. No. 4,793,981 issued on Dec. 27, 1988.

At the present time, emphasis is being placed on the development of a new retrofit technology adapted to control $SO_x$ and particulate emissions using a modified electrostatic precipitator (ESP). This retrofit technology is called E-$SO_x$.

Electrostatic precipitators are devices which are known in the art to produce an electric charge on the particles to be collected and then propel the charged particles by electrostatic forces to collecting curtains. Due to the high efficiency obtained at a generally favorable cost, a very high percentage of particulate-removal units installed in commercial boiler plants are electrostatic precipitators. In the E-$SO_x$ process the electrical components of the first field of an existing electrostatic precipitator are removed and a bank of atomizers or spray nozzles are installed.

FIG. 1 schematically depicts a prior art electrostatic precipitator generally designated 2 in place in a flue gas duct 4 downstream of a conventional pulverized coal (PC) boiler plant generally designated 6. The first field or spray chamber 8 of the electrostatic precipitator 2 has the existing electrical components removed. These electrical components include the collectors 16a in the electrical or active section 16. In lieu thereof, a bank of atomizers or spray nozzles 10 are installed. These atomizers 10 spray a slurry of an alkaline sorbent, usually slaked lime or any operable reagent known in the art, into the flue gas to react with sulfur dioxide to form solid calcium sulfite, a particulate.

The ESP 2 then removes this particulate along with the other particulates from the boiler in a conventional fashion. In this way the ESP 2 desulfurizes the gaseous emissions to the atmosphere.

Because the distance between the atomizers 10 and the electrically charged sections 16 of the modified electrostatic precipitator 2 may be as short as six feet, there are two shortcomings threatening to severely limit this retrofitable emission control technology.

First, complete evaporation of the lime slurry droplets in the space and time available is impossible on a practical basis. Conventional electrostatic precipitators are not designed to handle wet, sticky deposits which result if unevaporated droplets of the lime slurry enter the electrical sections 16 of the electrostatic precipitator 2.

The second problem concerns the velocity distribution produced by the atomizers 10 entering the electrical section 16 of the electrostatic precipitator 2. Specifically, the discharge velocity of the spray nozzles 10 is nearly sonic. Although the speed of the injected slurry from each atomizer 10 diminishes rapidly, the velocity distribution does not meet the Industrial Gas Cleaning Institute (IGCI) standards. The dust or particulate collection performance in electrostatic precipitator 2 is severely diminished by velocity mal-distribution.

Thus, there is a need in the industry for a device which is employable in the E-$SO_x$ process which selectively removes only the large wet unevaporated droplets so that the surface of the electrical sections 16 do not become over-burdened with both dry and wet particulate, including the capability of removing the deposits which do form. Secondly, there is a need for this same device to act as a first stage of a flow correction device, as a minimum, to reduce the velocity mal-distribution which is typically produced by the atomizers 10.

SUMMARY OF THE INVENTION

The present invention solves the aforementioned prior art problems by providing an apparatus and method for separating unevaporated droplets from the flue gas stream so that wet, sticky deposits are not introduced into any conventional emission control equipment located downstream therefrom. Further, the present invention provides a method and apparatus for a first stage flow correction to reduce velocity mal-distribution produced from atomizers 10.

The present invention also resides in an impingement device which is designed to remove only the unevaporated droplets and wet particulate while allowing the dry particulate to pass uncollected. The wet particulate is collected and dried on the surface of the present invention to facilitate removal.

Accordingly, one aspect of the present invention is to provide an apparatus for separating unevaporated droplets from a hot gas stream comprising at least one row of a plurality of impingement members situated in a hot gas stream so that the gas stream passes therethrough, means for heating the impingement members to dry the impinging droplets thus forming deposits, and means for removing the deposits from the impingement members. The apparatus in its preferred embodiment has at least two rows of tubes vertically located in a plane normal to the gas stream in a staggered array.

Another aspect of the present invention is to provide a modified electrostatic precipitator employed in the E-SO$_x$ process. The electrostatic precipitator has at least one field of electrical components removed therefrom with a bank of atomizers arranged in the electrostatic precipitator. The present invention is downstream from the atomizers. Of course, the electrostatic precipitator may further be provided with a perforated plate or further flow correction devices downstream therefrom.

A still further aspect of the present invention is to provide a method for separating unevaporated droplets from a hot gas stream, comprising the steps of: providing at least one row of a plurality of impingement members in a gas stream so that the gas stream passes therethrough; heating the impingement members to dry the impinging droplets so as to form friable deposits; and removing the deposits from the impingement members. In the preferred method of the present invention there are at least two rows of a plurality of impingement members arranged vertically in a plane normal to the gas stream in a staggered array.

Advantageously, the foregoing aspects are achieved with a droplet impingement device of the present invention. This device separates unevaporated droplets from a hot gas stream while also acting as a flow correction device. One particular application makes possible the effective emission control in a retrofitable technology.

The various features of novelty which characterize the invention are pointed out with particularity in the claims annexed to and forming part of this disclosure. For a better understanding of the present invention, and the operating advantages attained by its use, reference is made to the accompanying drawings and descriptive matter in which a preferred embodiment of the invention is illustrated.

BRIEF DESCRIPTION OF THE DRAWINGS In the drawings:

FIG. 1 is a schematic block diagram of the prior artretofit technology E-$SO_x$ process.

FIG. 2 is a schematic block diagram of the present invention in place in an electrostatic precipitator with portions removed as modified according to the E-$SO_x$ process.

FIG. 3 is a top view illustration of a portion of the present invention as set forth in FIG. 2 indicating the path of the flue gas flow.

FIG. 4 is an elevated perspective view of an embodiment of the present invention as set forth in FIG. 2 and viewed removed from the electrostatic precipitator.

FIG. 5 is a cross-sectional view of the present invention within an electrostatic precipitator indicating the application of a rapping force.

DESCRIPTION OF THE PREFERRED EMBODIMENT

E-$SO_x$ is a retrofit process for coal-fired boilers, which combines in a single unit electrostatic precipitator technology for collecting particles and spray dryer technology for sulfur dioxide ($SO_2$) removal.

Referring to FIG. 1, there is shown a conventional pulverized coal boiler plant 6 which emits a flue gas flowing through the flue gas duct 4 entering an electrostatic precipitator 2. The electrostatic precipitator 2 has a first field of electrical components removed in a spray chamber 8 which has a bank of atomizers 10 arranged therein. An alkaline sorbent source 14 provides an alkaline slurry through duct 12 to the bank of atomizers 10 which spray the alkaline sorbent into the flue gas in spray chamber 8. The alkaline sorbent such as a lime slurry or slaked lime or any other reagent known in the art, reacts with the sulfur dioxide in the flue gas to form calcium sulfite, a particulate. The cold pipe prechargers 20 compensate for the smaller collector surface being available because of the modifications. The cold pipe prechargers 20 further compensate for the changes in resistivity characteristics. The cold pipe prechargers 20 are optional. The particulates are collected by collectors 16*a* and deposited in hoppers 18 from which they are disposed of in a landfill. In this fashion, the electrostatic precipitator 2 removes the fly ash along with the particulate from the boiler 6 and desulfurizes the gaseous emission from the flue gas to the atmosphere.

Because the distance between the atomizers 10 and the electrically charged sections 16 of the modified electrostatic precipitator 2 may be as short as six feet, two problems threaten to severely limit this technology. The first problem is that the ESP 2 is not designed to handle unevaporated droplets. The second problem is the velocity mal-distribution.

The present invention also referred to as a droplet impingement device consists of at least one row of a plurality of impingement members 22 situated in the flue gas stream. Preferably, these impingement members 22 are tubes or pipes that obstruct the flow of unevaporated droplets in the flue gas stream and consist of two or more rows in a vertical arrangement located in a plane normal to the gas flow. The impingement members 22 are situated immediately upstream of the first electrical section 16 of the electrostatic precipitator 2. In FIG. 1, this is immediately before the first cold pipe precharger 20 which is downstream of the bank of atomizers 10 as indicated by the arrow depicting the flow of the flue gas in the duct 4.

Referring next to FIG. 2, the plurality of impingement members 22 are arranged in a staggered array with a tube diameter equal to or larger than the distance between the tubes 22 so as to divert the line-of-sight flow path of the flue gas. This arrangement causes all of the flue gas to change direction as it passes therethrough as is best illustrated in FIG. 3. As a result, the larger, unevaporated droplets of the alkaline sorbent impinge upon and adhere to the heated members 22. This is most likely owing to their greater inertia. The plurality of impingement members 22 may be oriented in any fashion that removes the unevaporated droplets.

FIG. 4 depicts a plurality of impingement members 22 as tubes or pipes connected in a staggered array to two cross members 24*a* and 24*b*. A source (not shown) provides a means for heating with steam, in the preferred embodiment. Steam enters the plurality of tubes 22 in the cross member 24*a* and out through cross member 24*b*. Preferably, the heating means is steam or hot water although heating elements are envisionable. Since the surface of the tubes 22 are heated, the impinging droplets of alkaline sorbent dries and forms deposits which become friable with time. The drying action is further facilitated by the hot flue gas as it passes through the impingement members 22 over the deposits.

A rapping force such as that produced by a conventional rapper contacting the members 22, 24 removes these deposits. The rapping technique is similar to the rapping method conventionally used in electrostatic precipitators. FIG. 5 depicts a rapper 26 mounted to the outer casing 30 of the precipitator which makes periodic contact with impingement device through a rapping bar 28, which protrudes through the casing. A sootblower is another means for removing the deposits. Both of these devices are well known in the art and need no explanation on their operability. One drawback with sootblowing is the momentary high velocity disturbance which may be deleterious. Mechanical scraping options may also be employed. The dislodged deposits fall into the hoppers 18 of the electrostatic precipitator 2 and then are disposed of in a conventional manner.

The materials of the present invention are preferably constructed of stainless steel, but suitable materials include other metals and alloys capable of withstanding high temperatures.

Since the present invention presents an obstacle to the flue gas flow, it also acts as a flow correction device much like a perforated plate. Preliminary tests have shown that a velocity mal-distribution characterized with a standard deviation of 238% typical of that produced by atomizing nozzles 10 at a distance of nine feet is reduced to about 29% with the present invention. Even though this still does not meet IGCI standards, it does provide an excellent first stage for flow correction. Since the present invention removes the unevaporated droplets, conventional flow correcting devices such as a perforated plate, deflectors, and/or egg crates may be placed downstream to further correct the flow so as to meet the standards.

Even though the foregoing description sets forth the present invention specifically in resolving problems associated with the E-$SO_x$ process in the emission control of fossil fuel fired boilers, the present invention as a droplet impingement device has wider applications in any system which requires the separation of unevaporated droplets from a hot gas stream.

While a specific embodiment of the invention has been shown and decribed in detail to illustrate the application and the principles of the invention, certain modifications and improvements will occur to those skilled in the art upon reading the foregoing description. It is thus understood that all such modifications and improvements have been deleted herein for the sake of conciseness and readability but are properly within the scope of the following claims. Such a modification is to employ a staggered array of varying diameter tubes 22. Another such example is to change the shape of the impingement members 22 into the form of a perforated plate with similar heating and removing means.

I claim:

1. A method for removing $SO_x$ and particulates from a flue gas stream containing unevaporated droplets, comprising the steps of:
    providing an electrostatic precipitator in the flue gas stream with the electrostatic precipitator having at least one field of electrical components removed therefrom;
    arranging a bank of atomizers in the electrostatic precipitator in the field without the electrical components;
    spraying an alkaline sorbent into the flue gas stream with the bank of atomizers;
    situating at least two rows of a plurality of impingement members downstream of the atomizers and upstream of the electrical components in a staggered array in a plane normal to the flue gas stream so that the gas stream passes therethrough;
    drying the impinging droplets on the impingement members to form friable deposits; and
    removing the friable deposits from the impingement members 2. A method according to claim 1, wherein the step of drying includes providing steam flow through said impingement members.

3. A method according to claim 1, wherein the step of drying includes providing hot water flow through said impingement members.

4. An apparatus for removing sulfur oxides ($SO_x$) and particulates from a flue gas stream, comprising:
    an electrostatic precipitator situated in the flue gas stream, said electrostatic precipitator having at least one field of electrical components removed therefrom;
    a bank of atomizers arranged in said electrostatic precipitator in the field without the electrical components for spraying an alkaline sorbent into the flue gas;
    at least two rows of impingement members situated downstream of said atomizers in said electrostatic precipitator and upstream of the electrical components in the flue gas stream in a staggered array in a plane normal to the flue gas stream so that the flue gas stream passes therethrough;
    means for drying impinging droplets on said impingement members to form friable deposits; and
    means for removing the formed friable deposits from said impingement members.

5. An apparatus as defined in claim 1, wherein said removing means is a rapper.

6. An apparatus as defined in claim 1, wherein said removing means is a sootblower.

7. An apparatus as defined in claim 1, wherein said impingement members are tubes.

8. An apparatus as defined in claim 3, wherein said drying means includes passing steam through said tubes.

9. An apparatus as defined in claim 3, wherein said drying means includes passing hot water through said tubes.

10. An apparatus for controlling emissions of a fossil fuel fired boiler which produces flue gases containing $SO_x$ and particulates, comprising:
    a flue gas duct for carrying flue gases from the boiler;
    an electrostatic precipitator attached to said flue duct downstream from the boiler, said electrostatic precipitator having at least a first field of electrical components removed therefrom;
    a bank of atomizers arranged in said electrostatic precipitator in the first field without the electrical components for spraying an alkaline sorbent into the flue gas;
    at least two rows of impingement members situated downstream of said atomizers in said electrostatic precipitator and upstream of the first field of electrical components, said impingement members being arranged in two rows located in a plane normal to the flue gas stream in a staggered array so that the flue gas passes therethrough;
    means for drying the impinging droplets on said impingement members, to form friable deposits; and
    means for removing the friable deposits from said impingement members.

11. An apparatus according to claim 10, wherein said removing means is a rapper.

12. An apparatus according to claim 10, wherein said removing means is a sootblower.

13. An apparatus according to claim 10, wherein said impingement members are tubes.

14. An apparatus according to claim 13, wherein said drying means includes providing steam flow through said tubes.

15. An apparatus according to claim 13, wherein said drying means includes providing hot water flow through said tubes.

* * * * *